UNITED STATES PATENT OFFICE.

WILLIAM MORLEY MARTIN, OF REDRUTH, ENGLAND.

TREATING COMPLEX ORES OR THEIR CONCENTRATES.

1,066,829. Specification of Letters Patent. Patented July 8, 1913.

No Drawing. Application filed April 15, 1910. Serial No. 555,632.

*To all whom it may concern:*

Be it known that I, WILLIAM MORLEY MARTIN, a subject of the King of Great Britain, residing at 5 Trewirgie road, Redruth, in the county of Cornwall, England, analytical chemist, have invented certain new and useful Improvements in Treating Complex Ores or Their Concentrates, of which the following is a specification.

In my application for United States Letters Patent No. 545,520 dated 23rd February 1910, I have described a process of treating complex ores consisting in rendering them more amenable to concentration and to the separation of their constituent minerals by that form of water concentration which depends on separation by water owing to differences in size and specific gravity of the particles, which process of treating consists in mixing the subdivided ore or a concentrate thereof with a solution of an oxidizing agent adapted partially to oxidize the ore at a raised temperature, heating the mass and subjecting the mass to any process of water concentration as above defined. It was explained in that specification that by the term concentration processes I do not include leaching or processes which operate thereby. It was also explained that the action of the oxidizing agent is not known to me, since although oxidation may occur it is uncertain whether this oxidation is the cause of the result or whether it is a mere accident to the actual cause.

My present invention relates to a treatment of complex ores or concentrates thereof by mixing such ore or concentrate in a sub-divided state with a solution of a suitable oxidizing agent and exposing the mass to a temperature between ordinary temperature and a temperature of about 300° C.

The best oxidizing agents for mixing with the subdivided ore are nitrates whether used in solution, though the more active agents like a bichromate or a permanganate have in many cases a better effect at ordinary temperatures than a nitrate has.

The proportion of the oxidizing agent to be used varies with the nature of the ore or concentrate to be treated but generally speaking the smaller the proportion of gangue in an ore the larger must be the proportion of the oxidizing agent, so a concentrate requires a more liberal quantity of the agent than the crude ore. On the other hand when one of the valuable constituents of the ore is in a very fine state of division, the quantity of the agent may be smaller than when all the constituents are less finely divided. In any case the proportion is comparatively small, about two per cent. of the weight of the ore generally sufficing for a crude ore.

I have found that in the case of many ores, especially those containing sulfids of lead and zinc together with iron pyrites, if the mass which has been heated with the oxidizing agent, or the mass which has been saturated with the solution of the oxidizing agent and subsequently heated or not, is subjected to a limited oxidizing roasting operation, the iron pyrites, in so far as it may not have been already oxidized, may be oxidized first; the mass may then be subjected to water concentration to separate the oxid of iron from the sulfites of lead and zinc and the said sulfids may again be subjected to a limited oxidizing roasting in order to oxidize the zinc sulfid. A second concentration will now separate the zinc oxid and sulfate (if any) from the lead sulfid.

In some cases the limited roasting may be carried far enough to oxidize both the pyrites and the zinc sulfid, a single concentration then serving to separate the lead sulfid, separation of the iron and zinc oxids being otherwise effected. The possibility of effecting such a differential calcination or roasting arises from the preliminary treatment with an oxidizing agent in one of the ways above described.

As examples of the process the following may be given:—

1. A complex sulfid ore containing lead and zinc is suitably subdivided and saturated with a solution of sodium nitrate: when necessary for complete saturation the ore may be stirred with the solution in any appropriate manner. The strength of the solution should be such as to introduce the required proportion of the oxidizing agent into the mass of ore, 2 per cent. of the weight of the ore being appropriate in many cases. The excess of liquid, if any, is now drained away and the ore concentrated by a water concentration process as above defined, either without first drying it, or after it has been dried with or without gentle heating, such as to a temperature of 120° C.

2. A complex sulfid ore containing lead and zinc together with iron pyrites is suitably subdivided and treated with sodium nitrate in the manner described in Example 1. The mass is then subjected to a limited roasting operation by heating it in a furnace of the kind usually used for roasting, to which furnace the supply of air is limited. The iron pyrites will be oxidized rapidly and the process is easily stopped at this stage. The cooled roasted ore is then concentrated by a water concentration process as above defined to separate the oxidized pyrites from the other metalliferous minerals, whereupon the treatment with sodium nitrate is repeated and the mass is again subjected to a limited roasting operation to oxidize the lead sulfate, and finally concentrated.

Having thus described my said invention and the best means I know of carrying the same into practical effect, I claim:—

1. A process of treating complex ores containing sulfids of lead and zinc, or concentrates thereof, so as to recover the valuable constituents in a separated condition, which process consists in mixing the sub-divided ore with a solution of an oxidizing agent in proportion insufficient to desulfurize the ore, then exposing the mass to a temperature not exceeding 300° C., then gravitally separating the mixture by water.

2. A process of treating complex ores containing sulfids of lead and zinc, or concentrates thereof, so as to recover the valuable constituents in a separated condition, which process consists in mixing the sub-divided ore with a solution of an oxidizing agent in proportion insufficient to desulfurize the ore, then exposing the mass to a temperature not exceeding 300° C., then subjecting the mass to a differential roasting, and gravitally separating by water to separate a constituent.

3. A process of treating complex ores containing sulfids of lead and zinc, or concentrates thereof, so as to recover the valuable constituents in a separated condition, which process consists in mixing the subdivided ore with a solution of an oxidizing agent in proportion insufficient to desulfurize the ore, then drying the ore after treatment with the solution, then subjecting it to a differential roasting, and gravitally separating by water to separate a constituent.

4. A process of treating complex ores containing sulfids of lead and zinc, or concentrates thereof, so as to recover the valuable constituents in a separated condition, which process consists in mixing the subdivided ore with a solution of an oxidizing agent in proportion insufficient to desulfurize the ore, then subjecting the mass comprising the ore and the said agent to a differential roasting, gravitally separating by water to separate a constituent, and then successively repeating the operations of roasting and concentrating to separate other constituents.

5. A process of treating complex ores containing sulfids of lead and zinc, or concentrates thereof, so as to recover the valuable constituents in a separated condition, which process consists in mixing the subdivided ore with a solution of an oxidizing agent in proportion insufficient to desulfurize the ore, then heating the mass comprising the ore and the said agent, then subjecting the mass to a differential roasting, gravitally separating by water to separate a constituent, and then successively repeating the operations of roasting and concentrating to separate other constituents.

6. A process of treating complex ores containing sulfids of lead and zinc, or concentrates thereof, so as to recover the valuable constituents in a separated condition, which process consists in mixing the subdivided ore with a solution of an oxidizing agent in proportion insufficient to desulfurize the ore, then drying the ore after treatment with the solution, then subjecting it to a differential roasting, gravitally separating by water to separate a constituent, and then successively repeating the operations of calcining and concentrating to separate other constituents.

In testimony whereof I have signed my name to this specification in the presence of two subscribing witnesses.

WILLIAM MORLEY MARTIN. [L. S.]

Witnesses:
JOSEPH MILLARD,
W. J. SKERTEN.